United States Patent [19]  
Kenworthy et al.

[11] Patent Number: 4,852,355  
[45] Date of Patent: Aug. 1, 1989

[54] DISPENSING ARRANGEMENT FOR PRESSURIZED AIR

[75] Inventors: Milton J. Kenworthy; Robert C. King, both of Cincinnati, Ohio

[73] Assignee: General Electric Company, Cincinnati, Ohio

[21] Appl. No.: 262,086

[22] Filed: Oct. 24, 1988

Related U.S. Application Data

[63] Continuation of Ser. No. 528,870, Sep. 6, 1983, abandoned, which is a continuation-in-part of Ser. No. 219,286, Dec. 22, 1980, abandoned.

[51] Int. Cl.4 ............................................. F02C 7/12
[52] U.S. Cl. .................................... 60/751; 415/115
[58] Field of Search ................... 60/39.83, 39.29, 751; 415/115, 116, 177, 178; 416/95, 96 R, 97 R

[56] References Cited

U.S. PATENT DOCUMENTS

| 3,083,532 | 4/1963 | Cook | 60/39.66 |
| 3,581,492 | 6/1971 | Norgren et al. | 60/751 |
| 3,631,675 | 1/1972 | Keiter et al. | 60/751 |
| 3,826,084 | 7/1974 | Branstrom | 60/39.66 |
| 3,990,232 | 11/1976 | Campbell | 60/39.66 |
| 4,109,459 | 8/1978 | Ekstedt et al. | 60/39.66 |
| 4,291,531 | 9/1981 | Campbell | 60/751 |
| 4,296,599 | 10/1981 | Adamson | 415/116 X |

FOREIGN PATENT DOCUMENTS

| 911160 | 11/1962 | United Kingdom . |
| 1033922 | 6/1966 | United Kingdom . |
| 1081158 | 8/1967 | United Kingdom . |
| 1194684 | 6/1970 | United Kingdom . |
| 1284858 | 8/1972 | United Kingdom . |
| 2089894 | 8/1985 | United Kingdom . |

Primary Examiner—Louis J. Casaregola  
Attorney, Agent, or Firm—Derek P. Lawrence

[57] ABSTRACT

An air dispensing arrangement within a gas turbine engine in which the energy of the pressurized air exiting the compressor is nonuniform. The higher energy pressurized air is dispensed by at least one conduit to the combustor and to other components, the higher energy air providing an improved cooling capability over the lower energy air. Provision is also made to employ the lower energy air for uses such as the dilution of the combustor gases.

2 Claims, 2 Drawing Sheets

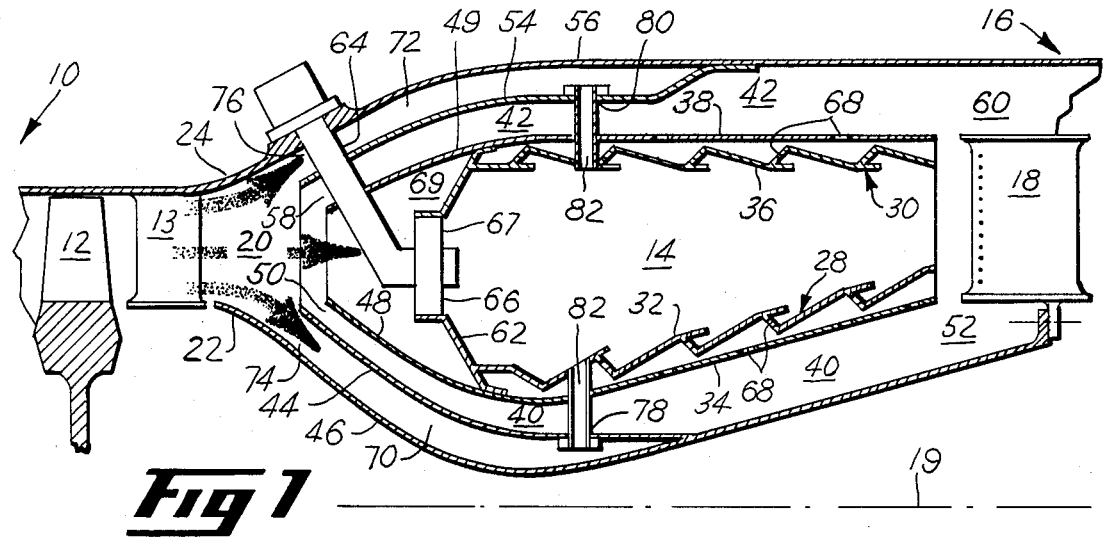
*Fig 1*
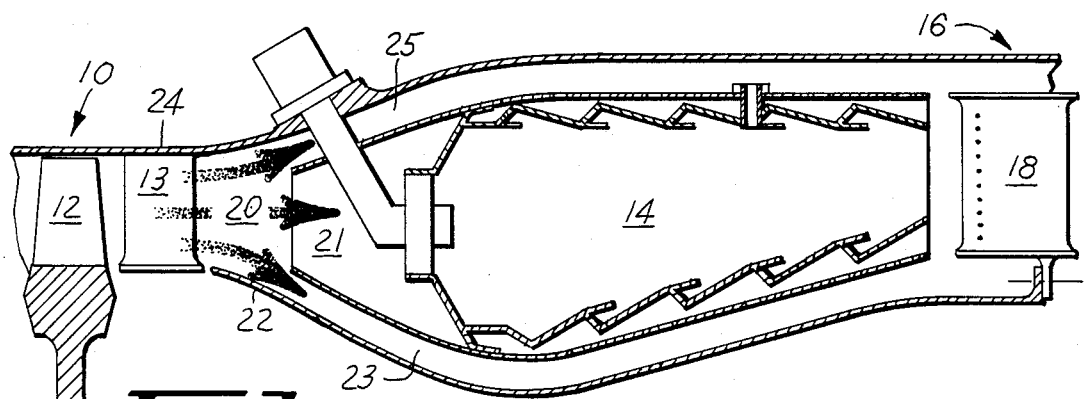
*Fig 3* PRIOR ART
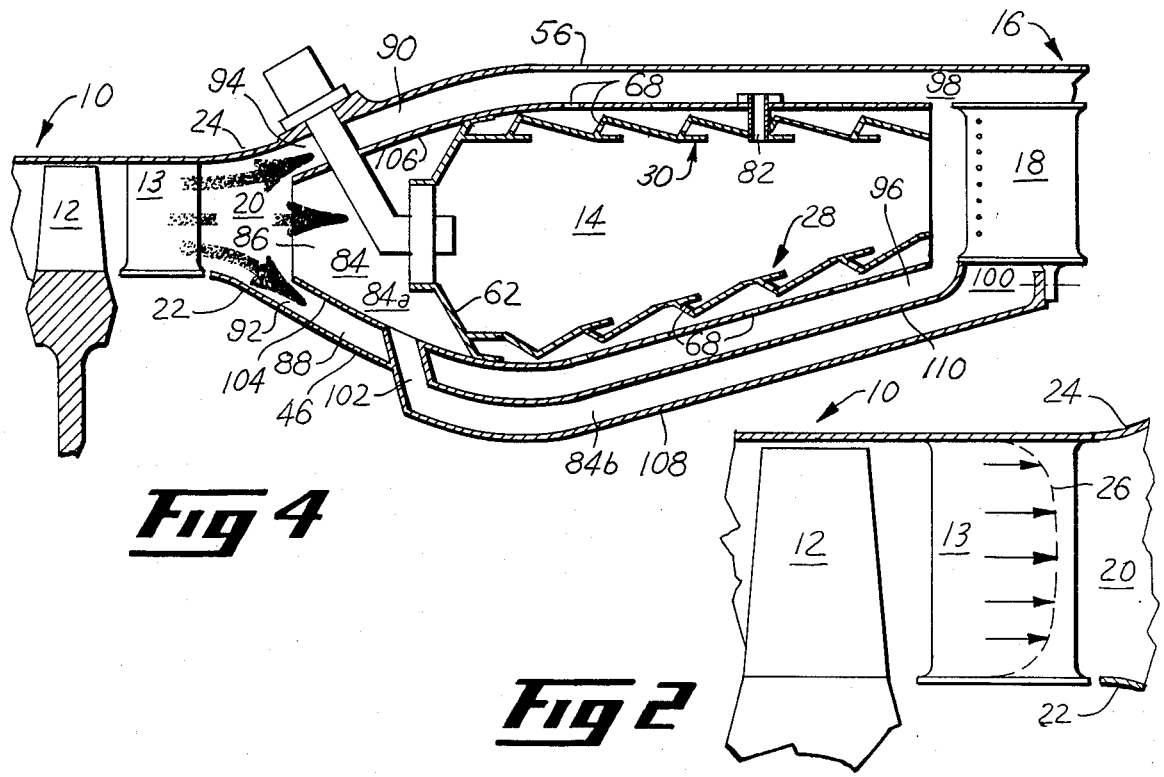
*Fig 4*
*Fig 2*

DISPENSING ARRANGEMENT FOR PRESSURIZED AIR

This is a continuation of application Ser. No. 528,870, filed Sept. 6, 1983 (abandoned) which is a continuation-in-part of application Ser. No. 219,286, filed Dec. 22, 1980 (abandoned).

BACKGROUND OF THE INVENTION

1. Field of the Invention

This invention relates to air dispensing arrangements within gas turbine engines, and particularly to a new and improved air dispensing arrangement which permits higher and lower energy pressurized air to be selectively dispensed to engine components where that level of energy air will be most effective.

2. Description of the Prior Art

The pressurized air supplied by a compressor within a gas turbine engine has numerous uses. In one use, the pressurized air is introduced into the combustor of the engine wherein it is mixed with fuel and ignited. The resulting hot gases flow across a turbine, causing the turbine rotor to rotate. Work is extracted from the turbine and used, for example, to rotate a compressor, a fan, or a propeller.

The pressurized air supplied by the compressor is also used to cool engine components, such as the combustor walls and the turbine, both of which are heated by the hot combustor gases. The maximum temperature to which components, such as the cumbustor walls and the turbine, can be subjected is often an operating limitation of the engine. Therefore, if these components can be cooled more effectively, the combustor gases can be burned at a higher temperature without exceeding component temperature limitations. The ability to burn combustor gases hotter results in an increased range of engine performance.

With respect to the cooling function of the pressurized air, prior art air dispensing arrangements present certain limitations. More specifically, as the pressurized air exits the compressor, it passes through a duct, such as a diffuser. Because air has viscosity, the pressurized air flowing close to the walls of the duct is slowed. At the very surface of the duct walls, the air particles are slowed to a relative velocity of near zero. At greater distances from the duct wall surface, the air particles experience progressively smaller velocity retardation until at some point, the local velocity reaches the full value of airflow nearer the center of the duct interior. The layer of air flowing close to the duct wall surface which displays velocity retardation is called the "boundary layer".

The kinetic energy of the air is defined by the formula $\frac{1}{2}mv^2$, where "m" represents the mass of the air and "v" represents the velocity of the air. Due to decreased velocity, the energy of the air flowing within the boundary layer is lower than it is outside of the boundary layer. Thus, the pressurized air flowing adjacent the walls of the above-mentioned duct includes lower energy air while the pressurized air flowing nearer the center of the interior of the duct includes primarily higher energy air.

Most prior air dispensing arrangements within gas turbine engines are so disposed that the higher energy pressurized air exiting from near the center region of the duct interior is channeled through the combustor dome into the combustor to be mixed with fuel and burned therein. However, the air used to cool the combustor walls and turbine or other components, comprises the remainder of the air exiting the duct, namely, the lower energy pressurized air flowing from adjacent duct walls. The lower energy air is typically dispensed by conduits to flow along the outside of the combustor walls and is finally directed onto the turbine. Such lower velocity, lower energy air is able to accept less heat from hot engine components and is thus less effective for cooling the combustor walls and turbine than would be the higher velocity, higher energy air which, in prior art arrangements, is used primarily for combustion.

Additionally, many combustors employ dilution holes in the walls thereof to inject relatively large amounts of air into the combustor to dilute the hot gases therein. The air for such dilution is, in most prior art air dispensing arrangements, extracted from the lower energy air flowing along the outside of the combustor walls. Such extraction reduces even further the amount, and thus the effectiveness, of the lower energy air to cool the combustor walls and turbine.

In view of the above problems, it is therefore an object of the present invention to increase engine performance by providing an air dispensing arrangement having an improved capability for cooling engine components.

Another object of the present invention is to provide an air dispensing arrangement which can supply dilution air to a combustor without significantly affecting the cooling of engine components.

SUMMARY OF THE INVENTION

The present invention comprises an air dispensing arrangement within a gas turbine engine. The invention is applicable to a gas turbine engine of the type which includes a compressor for supplying pressurized air, a duct which is communicably adjacent a downstream end of the compressor, a combustor downstream of the duct, and at least one other component, and in which the energy of the pressurized air which flows through the duct is non-uniform, that is, it includes higher and lower energy air. The arrangement dispenses a portion of the higher energy air to at least one engine component other than the combustor. The invention comprises at least one conduit which is disposed for receiving the higher energy air exiting the duct and dispensing the higher energy air to the engine component.

In a particular embodiment of the invention, there is further included at least one secondary conduit for receiving the lower energy air exiting the duct and dispensing it to selected components of the engine.

BRIEF DESCRIPTION OF THE DRAWING

This invention will be better understood from the following description taken in conjunction with the accompanying drawing, wherein:

FIG. 1 is a cross-sectional view of an air dispensing arrangement surrounding a combustor and incorporating features of the present invention.

FIG. 2 is an enlarged, fragmentary cross-sectional view of a duct of FIG. 1 showing a velocity profile of the air flowing therethrough.

FIG. 3 is a cross-sectional view of a typical prior art air dispensing arrangement.

FIG. 4 is a cross-sectional view showing an alternate embodiment of the present invention.

DESCRIPTION OF THE PREFERRED EMBODIMENT

Figure 5:
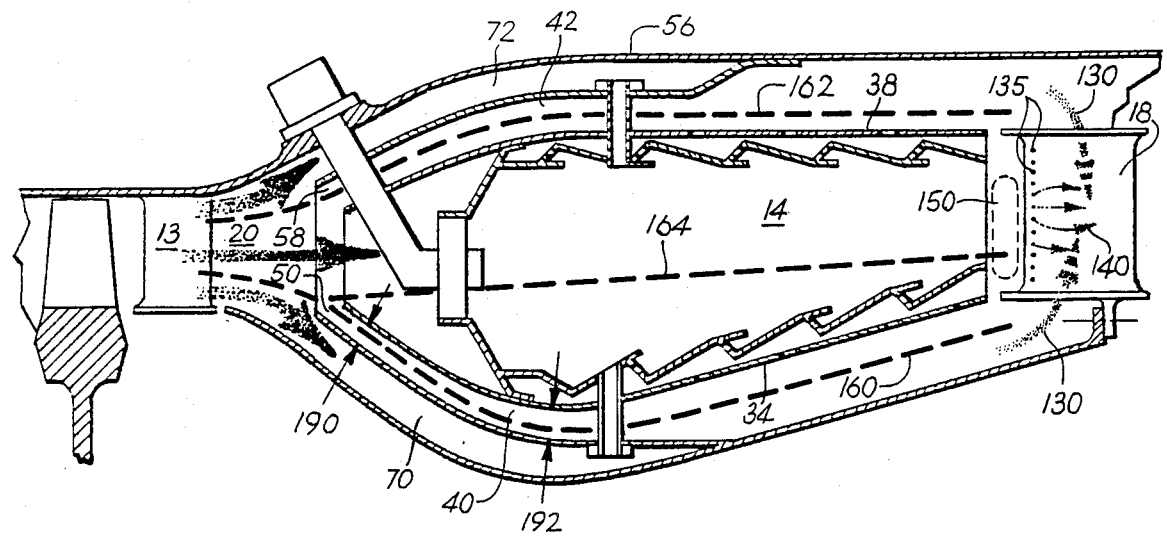
FIG. 5 is a cross-sectional view of one form of the present invention.

Turning now to a consideration of the drawing, and in particular to FIG. 1, there is shown a portion of the upper half of a gas turbine engine incorporating an embodiment of the present invention. A portion of the engine shown includes a compressor 10 represented by a last stage compressor blade 12 and guide vane 13, a combustor 14, and a turbine 16 represented by a first stage turbine stator 18.

The compressor 10 is preferably of the axial flow type such that when the compressor operates, pressurized air exits it in a generally axial direction, that is, generally parallel to the engine longitudinal axis, depicted by the dashed line 19. The pressurized air exits the compressor 10 and flows through a duct 20, which is communicably adjacent the downstream end of the compressor 10. The duct 20 is preferably annular and defined by a plurality of walls, such as the concentric radially inner and outer walls 22 and 24 respectively. By "radially" it is meant in a direction generally perpendicular to the engine longitudinal axis 19. The duct 20 can have any desired shape. In many engines, the duct 20 will define a diffuser; that is, in a downstream direction, the area of the duct increases.

Referring now to FIG. 2, there is shown an enlarge view of the duct 20. As the pressurized air exits the compressor 10 and flows past the guide van 13 and through the duct 20, the air flowing close to the walls 22 and 24 of the duct is slowed by viscous action resulting in boundary layers along each of the walls. The arrows and dashed lines 26 represent a velocity profile of the pressurized air as it flows through the duct 20, the shorter length of the arrow, the slower the velocity of the air at that point.

The kinetic energy of the air is defined by the formula $\frac{1}{2} mv^2$, where "m" represents the mass of the air and "v" represents the velocity of the air. The kinetic energy of the air is directly proportional to the square of the velocity. Thus, the pressurized air flowing close to the walls 22 and 24 of the duct 20 which has a lower velocity due to viscous action possesses lower energy than does the higher velocity air flowing nearer the center of the interior of the duct, spaced apart from the walls.

In some cases, the boundary layer in which the lower velocity and thus lower energy air flows may be relatively shallow, that is, confined close to the walls 22 and 24. Nevertheless, in considering the air flowing "adjacent" the walls 22 and 24, that is, both air flowing within and at some distance outside the boundary air, the average energy of that air will be lower than the average energy of the air flowing nearer the center region of the interior of the duct. It is this air, which has a lower average energy level, which is hereinafter referred to as "lower energy air."

Engine performance can be improved by selectively employing the higher and lower energy air to perform the most effective functions. The lower energy air flowing adjacent the walls of the duct 20 can be effectively used for functions such as diluting hot combustion gases within the combustor. The higher energy air, on the other hand, is more effective than is the lower energy air for mixing with fuel and burning in the combustor and for exchanging heat with, or cooling, engine components. The present invention selectively employs the higher and lower energy air to improve engine efficiency. However, for comparison purposes, reference is briefly made to FIG. 3, where the same numerals are used to identify elements identical to those of FIG. 1, and wherein there is shown a typical prior art arrangement of conduits leading from a duct 20 to and around a combustor 14. A center conduit 21 carries the higher energy air from the duct 20 to the combustor 14 to be used for combustion. However, radially inner and outer conduits 23 and 25 respectively receive the lower energy air flowing adjacent the inner and outer walls 22 and 24 of the duct 20 to cool the walls of the combustor 14 and to cool elements downstream of the combustor, such as the turbine 16. Thus, the cooling of combustor walls and other engine components, such as the turbine 16, is accomplished through the use of lower energy air rather than higher energy air.

Returning now to FIG. 1, the present invention comprises an arrangement of conduits which are so disposed as to receive either the higher energy air or the lower energy air and then dispense the appropriate energy level air to the selected components of the engine where it will be most effective. For example, the arrangement permits a relatively greater amount of higher energy air to be employed for cooling the combustor and other engine components than does the prior art arrangement shown in FIG. 3. For clarity, the conduits carrying primarily higher energy air will be referred to as "primary conduits" and those carrying primarily lower energy air will be referred to as "secondary conduits".

In the configuration shown in FIG. 1, the combustor 14, which is disposed downstream of the duct 20, is annular and is defined by generally radially inner and outer walls, designated generally as 28 and 30, respectively. Although the combustor 14 is shown as including inner and outer liners 32 and 34 defining the inner wall 28, and inner and outer liners 36 and 38 defining the outer wall 30, this is just one example of a combustor construction, and the present invention can be effectively employed with other combustor constructions as well. Also, "can" combustors and "can-annular" combustors, as well as annular combustors, are compatible with the present invention.

The arrangement for dispensing the pressurized air includes at least one primary conduit which includes an upstream opening disposed for receiving the higher energy air which exits the duct 20 and a downstream opening which is disposed adjacent the component, such as the turbine 16, to which a portion of the higher energy air is to be dispensed.

More specifically, the configuration of FIG. 1 includes an inner primary conduit 40 and an outer primary conduit 42. The inner primary conduit 40 extends substantially adjacent the inner wall 28 of the combustor 14. The inner primary conduit 40 is preferably annular and is defined along its radially inner boundary by an annular generally axially extending baffle 44 and a portion of the inner casing 46 from which the baffle 44 extends. The radially outer boundary of the inner primary conduit 40 is defined by the inner wall 28 of the combustor 14. If desired, an annular baffle 48 extending from the inner wall 28 of the combustor 14 can be included so as to further define the radially outer boundary. The inner primary conduit 40 includes an upstream opening 50 which is disposed downstream of the center region of the interior of the duct 20 and which is aligned for receiving the higher energy air which exits that region of the duct. The inner primary conduit 40 also includes a downstream opening 52 which is disposed adjacent an engine component, such as the turbine 16, for dispensing a portion of the higher energy air thereto.

The outer primary conduit 42 extends substantially adjacent the outer wall 30 of the combustor 14. The outer primary conduit 42 is preferably annular and is defined along its radially outer boundary by an annular, generally axially extending baffle 54 and a portion of the outer casing 56 from which the baffle 54 extends. The radially inner boundary of the outer primary conduit 42 is defined by the outer wall 30 of the combustor 14. If desired, an annular baffle 49, extending from the outer wall 30 of the combustor 14, can be included so as to further define the radially inner boundary. The outer primary conduit 42 includes an upstream opening 58 which is disposed downstream of the center region of the interior of the duct 20 and aligned for receiving the higher energy air therefrom. The outer primary conduit 42 also includes a downstream opening 60 which is disposed adjacent an engine component, such as the turbine 16 for dispensing a portion of the higher energy air thereto.

As can be seen in FIG. 1, included at the upstream end of the combustor 14 is the combustor dome 62 and its associated elements, such as the fuel line 64 and the swirl cup 66. Means are included for introducing a portion of the higher energy air into the combustor 14. Such means can comprise openings 67 in the combustor dome 62 which can be disposed, for example in the swirl cup 66. When the baffles 48 and 49 are included in the air dispensing arrangement, they comprise further elements of the means for introducing higher energy air into the combustor 14. When included, the baffles 48 and 49 define a combustor inlet 69 which is disposed downstream of the center region of the duct 20 and aligned for receiving higher energy air therefrom. That air is mixed with fuel in the combustor dome and the resulting mixture is burned within the combustor 14. The portion of the higher energy air which is not introduced into the combustor 14 through the openings 67 flows through the inner primary conduit 40 and the outer primary conduit 42 and is dispensed to elements downstream of the combustor 14, such as to the turbine 16, for whatever purpose is desired, such as for cooling. Of course, as the higher energy air flows through the inner and outer primary conduits 40 and 42, it cools the surfaces to which it is exposed, such as the combustor inner and outer walls 28 and 30. Additionally, the inner and outer primary conduits 40 and 42 and include orifices intermediate the upstream and downstream openings 50, 58, 52 and 60, respectively, for supplying a portion of the higher energy air can be supplied through the orifices 68 for impingement and film cooling of the combustor inner and outer liners 32, 34, 36 and 38.

The air dispensing arrangement of this invention can also include at least one secondary conduit which has an upstream opening disposed for receiving the lower energy air which exits the duct 20 and a downstream opening disposed adjacent a selected component of the engine to dispense the lower energy air thereto.

For example, the configuration shown in FIG. 1 includes an annular inner secondary conduit 70 and an annular outer secondary conduit 72. The inner and outer secondary conduits 70 and 72 include upstream openings 74 and 76, respectively, which are disposed downstream of and aligned substantially adjacent the walls 22 and 24, respectively, of the duct 20 for receiving the lower energy air which flows adjacent those walls. The inner secondary conduit 70 extends substantially adjacent and radially inwardly of the inner primary conduit 40 and is defined by the annular baffle 44 and the inner casing 46. The outer secondary conduit 72 extends substantially adjacent and radially outwardly of the outer primary conduit 42 and is defined by the annular baffle 54 and the outer casing 56. The inner and outer secondary conduits each include a downstream opening 78 and 80, respectively, for dispensing the lower energy air to a desired engine component. For example, the configuration shown in FIG. 1 includes dilution hole thimbles 82 extending through the walls 28 and 30 of the combustor 14 for introducing air into the combustor to dilute the hot gases resulting from combustion. The downstream openings 78 and 80 of the inner and outer secondary conduits 70 and 72 are in communication with and are disposed to dispense at least a portion of the lower energy air through the dilution hole thimbles 82 and into the combustor 14. Thus, the lower energy air provides a supply of dilution air for the combustor, leaving the higher energy air to be sued for combustion and cooling. Of course, the lower energy air carried by the inner and outer secondary conduits 70 and 72 can be used for any other desired purpose.

The higher energy air carried by the inner and outer primary conduits 40 and 42 in FIG. 5 can, after exposure to the outer combustor liners 34 and 38, be used to cool an additional engine component, such as the first stage turbine stator 18. In such a case, cooling airstreams 130 enter the stator 18, which is hollow, and exit the stator 18 through holes 135 as airstreams 140. This stator cooling allows exhaust gases exiting the combustor 14 to be hotter, without damaging the stator 18, thus increasing engine efficiency.

The cooling of the stator 18 points to an important aspect of the present invention. In order for air to flow out of the holes 135 in the stator 18, the pressure within the hollow stator 18 must exceed that outside the stator at region 150, this region being located at the outlet of the combustor. Combustor designers sometimes refer to this excess in pressure as the Back Flow Margin (BFM), and one such margin used is a pressure differential of a few percentage points between the interior of stator 18 and region 150 in FIG. 5.

In order to establish the BFM in the present invention, the pressure drop ($\Delta P_1$) along the primary conduits 40 and 42, that is, the drop occurring along dashed lines 160 and 162, must be less than the pressure drop ($\Delta P_2$) occurring through the combustor, namely along dashed line 164. Pressure drops $\Delta P_1$ and $\Delta P_2$ are expressed as differences from the average compressor discharge pressure at guide vane 13. Of course, $\Delta P_1 - \Delta P_2 = BFM$. The prior art device of FIG. 3, in establishing its $\Delta P$'s along conduits 23 and 25 analogus to $\Delta P_1$ in FIG. 5, faces a disadvantage, as will now be explained with reference to FIG. 6.

Figure 6:
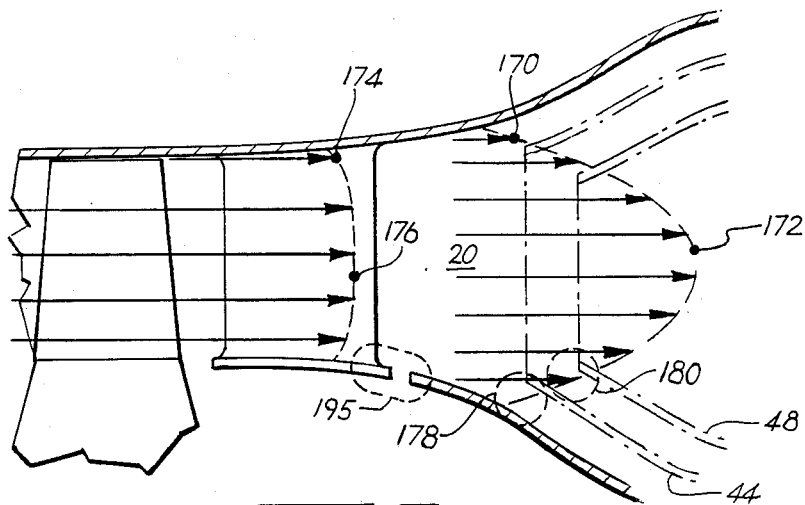
FIG. 6 is a view similar to that of FIG. 2 and showing greater detail of the diffusion of the air in duct 20.

FIG. 6 illustrates, in exaggerated form the change in the velocity gradient which occurs as airflow enters the duct 20. The duct 20 acts as a diffuser. The gradient in the duct 20 becomes much steeper, inasmuch as the difference in velocity and pressure between downstream points 170 and 172 is greater than the difference between upstream points 174 and 176. In utilizing the air in the duct 20, the prior art device of FIG. 3 taps an airstream portion located just above the number "22" in FIG. 3. This portion contains low-energy, low-velocity air, since this air is taken from the low velocity region, region 178, of the velocity profile of FIG. 6.

As this airstream portion is conducted along conduit 23 to the hollow stator 18 in FIG. 3, its velocity and pressure are further reduced, though slightly perhaps. Accordingly, the pressure of the air entering the stator vane 18 from the conduit 23 will be lower in pressure than that tapped off in the region above numeral 22. However, as stated earlier, a BFM must exist between the interior of the stator vane 18 and region 150 in FIG. 5. In order to establish this BFM, the pressure drop along the combustor must exceed that along the conduit 23 in FIG. 3. This greater pressure drop along the combustor is not desirable and illustrates a trade-off occurring in prior art designs: on the one hand, the greater combustor pressure drop promotes a larger BFM, which promotes cooling of the stator vane 18, thus allowing hotter combustor gases to impinge upon the stator vane 18. Hotter combustion gases provide a more efficient thermodynamic cycle than cooler gases. On the other hand, the larger combustor pressure drop needed to establish the BFM for better stator cooling results in a less efficient thermodynamic cycle. The trade-off resides in trading between combustor gas temperature and combustor pressure drop.

The present invention mitigates this trade-off by tapping an airstream at region 180 in FIG. 6, which is at higher pressure, velocity, and energy than that in region 178. In so doing, Applicants generate a higher pressure within the stator vane 18 than does the prior art device of FIG. 3, which taps an airstream from region 178. Consequently, the combustor pressure drop needed to establish a given BFM is reduced as compared with the FIG. 3 design. Therefore, a combination of a combustor gas temperature which is hotter than that feasible in the FIG. 3 design, together with a combustor pressure drop which is lower than that feasible in the FIG. 3 design, is provided in the present invention. This combination promotes greater overall efficiency than the FIG. 3 design and illustrates an important aspect of the present invention.

Characterized another way, the present invention utilizes the duct 20 in FIG. 5 as a diffusing duct which receives compressor air and diffuses it. The inner and outer primary conduits 40 and 42 have upstream openings or intakes 50 and 58 and the openings 50 and 58 have substantially the same annular height (dimension 190 in FIG. 5) as the remainder of the primary conduit generally, such as the height shown as dimension 192. Accordingly, an airstream is transmitted through the primary conduit to the hollow stator 18 with as little pressure drop as is feasible.

From another point of view, the primary conduits 40 and 42 receive substantially none of the boundary layer which exists along the wall of the casing 56 in FIG. 6. The boundary layer exists in region 195 and the boundary layer is instead received by the secondary conduits 70 and 72.

A second configuration of the invention is shown as FIG. 4, wherein the same numerals are used to identify elements which are identical to those of the first configuration.

This configuration includes inner and outer secondary conduits 88 and 90 which are preferably annular, the inner secondary conduit 88 being defined by the inner casing 46 and the inner combustor wall 28 including an annular baffle 104 extending therefrom, and the outer secondary conduit 90 being defined by the outer casing 56 and the outer combustor wall 30 including an annular baffle 106 extending therefrom. The inner and outer secondary conduits 88 and 90 include upstream openings 92 and 94 respectively, which are disposed downstream of and aligned substantially adjacent the walls 22 and 24, respectively, of the duct 20 for receiving lower energy air flowing adjacent the walls, and also include downstream openings 96 and 98, respectively, for dispensing the lower energy air to engine components, such as the turbine 16. Lower energy air can also be supplied from the inner and outer secondary conduits 88 and 90 through the orifices 68 for impingement and film cooling of the combustor walls 28 and 30 and through the dilution hole thimble 82 to dilute the hot gases within the combustor 14.

This configuration also includes a primary conduit 84 having an upstream opening 86 disposed downstream of the center region of the interior of the duct 20 and aligned for receiving higher energy air therefrom. A portion of the higher energy air flows from the primary conduit 84 into the combustor 14 through the combustor dome 62. The remainder of the higher energy air continues to flow through the primary conduit 84 to the downstream opening 100 thereof where it is dispensed to components of the engine, such as the turbine 16, for cooling or for any other desired purpose. The primary conduit 84 includes upstream and downstream sections 84a and 84b and extends through or crosses one of the secondary conduits, such as the inner secondary conduit 88, such that the downstream portion 84b extends adjacent the side of the secondary conduit opposite that of the combustor 14. The primary conduit 84 preferably is primarily annular, but it includes a plurality of passages 102, which can be tubular or of any other desired shape, communicably connecting the upstream and downstream sections 84a and 84b thereof. The passages 102 extend through, but are not in communication with, the secondary conduit and they are shaped and sized so as to not completely block the flow of lower energy air through the secondary conduit 88. Thus, the primary conduit 84 is defined by the baffles 104 and 106 extending from the combustor walls 28 and 30, the passages 102, and the inner and outer conduit walls 108 and 110, which are preferably annular. The outer conduit wall 110 can be distinct wall, or, as is shown in FIG. 4, it can comprise the inner casing 46.

It is to be understood that this invention is not limited to the particular embodiment disclosed, and it is intended to cover all modifications coming within the true spirit and scope of this invention as claimed.

What is claimed is:

1. In a gas turbine engine combustor having a compressor which provides an airstream to a duct which diffuses the airstream, the improvement comprising:
    (a) means for tapping first and second airstreams from the diffusing airstream and for carrying the airstreams in respective primary and secondary conduits, the average energy level of the air in the primary conduit being higher than the average energy level of the air in the secondary conduit;
    (b) means for directing air from the secondary conduit into the combustor for diluting combustion gases;
    (c) means for directing air from the primary conduit into a hollow stator located near the outlet of the combustor for cooling the hollow stator;

2. In a gas turbine engine having a combustor surrounded by an annular casing, the upstream portion of the casing forming a diffusing duct which receives air from a compressor and diffuses the air, the improvement comprising:
   (a) an annular baffle positioned between the combustor and the annular casing, the annular baffle defining
      (i) a primary annular conduit between the annular baffle and the outer liner of the combustor and
      (ii) a secondary annular conduit between the annular baffle and the outer casing wherein air flowing from the compressor is divided into a first airstream flowing in the primary conduit and a second airstream flowing in the secondary conduit such that the average energy level of the airstream flowing in the primary conduit is higher than that of the airstream flowing in the secondary conduit;
   (b) means for directing air from the secondary conduit into the combustor for diluting combustion gases; and
   (c) means for directing air from the primary conduit into a hollow stator located near the outlet of the combustor for cooling the hollow stator.

* * * * *